United States Patent [19]

Tadokoro et al.

[11] Patent Number: 4,475,069

[45] Date of Patent: Oct. 2, 1984

[54] DOOR OPERATION CONTROL APPARATUS

[75] Inventors: Hiroyuki Tadokoro; Shigeru Matsuoka; Koji Yamauchi, all of Hitachi, Japan

[73] Assignee: Hitachi, Ltd., Tokyo, Japan

[21] Appl. No.: 327,630

[22] Filed: Dec. 4, 1981

[30] Foreign Application Priority Data

Dec. 12, 1980 [JP] Japan .............................. 55-174594

[51] Int. Cl.[3] .............................................. G06F 7/04

[52] U.S. Cl. .................................. 318/265; 318/266; 318/466; 318/264; 318/626; 318/281; 318/282

[58] Field of Search ............... 318/266, 466, 139, 439, 318/434, 266, 268, 244, 264, 626, 281, 282, 265

[56] References Cited

U.S. PATENT DOCUMENTS

| | | | |
|---|---|---|---|
| 4,328,540 | 5/1982 | Matsuoka | 318/266 X |
| 4,344,252 | 8/1982 | Suzuki | 318/266 X |
| 4,365,250 | 12/1982 | Matsuoka | 318/266 X |
| 4,386,398 | 5/1983 | Matsuoka | 318/266 X |

*Primary Examiner*—J. V. Truhe
*Assistant Examiner*—Paul S. Ip
*Attorney, Agent, or Firm*—Antonelli, Terry & Wands

[57] ABSTRACT

A motor driving a garage door is controlled by a controller, and the rotation of the motor in the normal and reverse directions is normally controlled in response to an actuating signal applied to the controller from a main push button switch. In a specific-mode in which an actuating signal is applied to the controller from an emergency push button switch, a mat switch or a fire sensor, the latter signal has priority over the former signal, and the motor is driven to move the garage door to its full-open position.

8 Claims, 10 Drawing Figures

DOOR OPERATION CONTROL APPARATUS

This invention relates to door operation control apparatus, and more particularly to an apparatus of the kind above described which is incorporated in a door operating apparatus operating a door such as a garage door and which includes, in addition to main commanding means and control means, additional commanding means and control means suitable for controlling a specific mode of door operation required to deal with a specific situation.

A garage door operating apparatus is disclosed in, for example, U.S. Pat. No. 4,328,540 and has generally a construction as schematically shown in FIGS. 1 to 4. FIG. 1 is a perspective view showing the general arrangement of components of the disclosed garage door operating apparatus, FIG. 2 is an enlarged longitudinal sectional view of part of the apparatus, FIG. 3 is a partly cut-away and partly sectional, top plan view of FIG. 2, and FIG. 4 is a partly cut-away perspective view of part of the apparatus.

Referring now to FIG. 1, the garage door operating apparatus comprises essential parts including a body 1 suspended from the ceiling of the garage and housing therein a driving system yielding drive force for moving a garage door 6, a rail 2 fixed at one end to the body 1 and at the other end to a portion of the inner wall of the garage by a header bracket 5, a roller chain 3 driven by the drive force of the driving system housed in the body 1, and a trolley 4 arranged for making a horizontal movement along the rail 2.

The garage door 6 openably closes the garage. The weight of the garage door 6 is balanced by a pair of balancing springs 8 so that the garage door 6 can be operated by a small drive force. A door bracket 9 is fixed to the garage door 6 which is guided by a pair of door rails 7 for opening and closing movement. The door bracket 9 is hinged to the trolley 4 by a door arm 10. (In FIG. 1, only one of the balancing springs 8 and only one of the door rails 7 are shown.) Thus, the garage door 6 can be opened and closed along the door rails 7 in interlocking relation with the movement of the roller chain 3 which is driven by the drive force of the body 1 to cause the horizontal movement of the trolley 4.

Electric power is supplied to the body 1 by a power supply cable 11. Depression of a push button switch 12 mounted on the inner wall of the garage generates a command signal for energizing the driving system housed in the body 1, or the driving system is energized under control of a control unit 13 which generates a control signal when a built-in receiver receives a radio frequency or like signal transmitted from a transmitter.

Should the garage door operating apparatus be rendered inoperative due to a power failure or other accident, a releasing string 14 is pulled to disengage the trolley 4 from the roller chain 3 so that the garage door 6 can be manually operated in such an event.

Referring to FIGS. 2 and 3, a motor 16 is fixedly mounted in a space defined between a body frame 15 and a body cover 40. The rotation of the motor 16 is transmitted through the motor shaft 16-*a*, a motor pulley 17, a V-belt 18, a large-diameter pulley 19 and a sprocket shaft 20 to a sprocket 21 making meshing engagement with the roller chain 3. These elements constitute the driving system.

Chain guides (A) 22, (B) 23 and (C) 24 guide the rollers of the roller chain 3 from opposite sides within the body frame 15. One end of the rail 2 is fixed to the body frame 15 by a rail fixture 25 in such a relation that the chain guide portion of the rail 2 mates with the chain guide groove defined between the chain guides (A) 22 and (C) 24 without any level difference and clearance. The roller chain 3 is taken up in a chain take-up casing 27 by being guided along a chain take-up groove 26 which is connected to the chain guide groove defined between the chain guides (A) 22 and (B) 23, without any level difference and clearance.

A limiting mechanism determining the upper and lower limits of the movement of the garage door 6, hence, limiting the horizontal movement of the trolley 4 includes an upper limit switch 30 and a lower limit switch 31. A pulley rack 28 formed on the outer periphery of the large-diameter pulley 19 is in meshing engagement with a pinion 29 which transmits the amount of rotation of the pulley rack 28 to the upper limit switch 30 or lower limit switch 31 depending on the direction of movement of the garage door 6. An upper limit adjusting knob 32 and a lower limit adjusting knob 33 are provided on the upper limit switch 30 and the lower limit switch 31 respectively so that the upper and lower limits of the movement of the garage door 6 can be freely adjusted from the outside of the body 1.

The chain guide groove formed by the chain guides (A) 22, (B) 23 and (C) 24 includes a curved path as seen in FIG. 3, and one of the sides of this curved path is provided by an obstruction sensing member 34 which is urged by a force resulting from impartation of a compressive force or a tensile force to the roller chain 3 during the downward movement or upward mcvement of the garage door 6. An obstruction spring 35 is disposed between the obstruction sensing member 34 and a spring retainer 37 to limit the movement of the obstruction sensing member 34, and an adjusting screw 36 for adjusting the force imparted to the obstruction sensing member 34 from the roller chain 3 is provided so that the compressive force of the obstruction spring 35 can be freely varied by moving the spring retainer 37 relative to the member 34 by turning the adjusting screw 36.

An obstruction sensing switch (an obstruction detecting limit switch) 34-*a* is turned on and off in response to the movement of the obstruction sensing member 34 so that, when the garage door 6 encounters an obstruction, such an obstruction is sensed, and the garage door operating apparatus is controlled to cause upward movement of the garage door 6 when it is moving downward and to stop the movement of the garage door 6 when it is moving upward.

A lamp 38 is provided for illuminating the inside of the garage. This lamp 38 is turned on and off in interlocking relation with the movement of the garage door 6. A controller 39 for controlling the energization of the lamp 38 and the motor 16 is fixed to the body frame 15. A semi-transparent lamp cover 41 covers the lamp 38.

The rail 2 described hereinbefore is provided by shaping a thin iron plate or plastic plate into a form as shown in FIG. 4. The trolley 4 is guided for sliding movement along the outer peripheral side portions of the rail 2, and the roller chain 3 is guided for linear reciprocating movement by being supported between the inner peripheral side portions of the rail 2. The trolley 4 is connected to the roller chain 3 by inserting a connecting member 4-*a* into a slot of a roller attachment 3-*a*, and this connecting member 4-*a* is vertically slidable and is normally urged upward by the force of a spring or the like. When it is required to disconnect the garage door 6 from the garage door operating apparatus and to manually operate the garage door 6, as in the event of power failure, the connecting member 4-*a* is pulled downward to be disengaged from the roller attachment 3-*a*. The door arm 10 is composed of an L-shaped door arm portion 10-*a* and a straight door arm portion 10-*b* which are connected to each other to have a total length which can be freely varied depending on the positional relation between the garage door 6 and the door rails 7. For the purpose of establishing the connection between the door arm 10 and the trolley 4, an elongated slot 4-*b* is provided in the trolley 4, and a pin 4-*c* normally pressed in a condition as shown in FIG. 4 by a spring or the like is inserted into the slot 4-*b* of the trolley 4. This arrangement is effective for absorbing a shock which will be imparted to the trolley 4 when the garage door 6 collides with an obstruction during its downward movement.

It is desirable that the garage door operating apparatus not cause reversing of the movement of the garage door 6 in response to the sensing of the presence of an obstruction such as a rise of the garage floor surface due to accumulation of snow, ice or the like or a small article such as a hose for water supply. That is, it is desirable that the movement of the garage door 6 not be reversed but be stopped when the presence of an obstruction is sensed within the range up to the height of, for example, two inches from the garage floor surface. In such a case, the difference between the amount of movement of the trolley 4 and that of the garage door 6 is absorbed by the slot 4-*b* above described.

It will be seen from the above description that the function of the main commanding means operating the garage door 6 is generally achieved by the depression of the push button switch 12 mounted on the inner wall of the garage or by the control unit 13 generating the control signal in response to the reception of the radio frequency or like signal from the transmitter by its built-in receiver.

Such main commanding means is good enough for achieving the garage door operating function. However, there may be such a situation that an inhabitant such as an infant, an aged man or a pet animal having a very low resistance to the garage door closing pressure may be present on the floor surface directly beneath the garage door when the garage door is making its closing movement. Further, because of the fact that, in many cases, the garage is erected adjacent to the house and an inhabitant can make access to the garage through the door provided in the wall separating the house from the garage, there may occur such a situation that, in the event of an accident such as setting of a fire or generation of a poisonous gas in the house, the vehicle and articles in the garage may also be damaged and the family must retire from the house through the garage. In such a situation, a fatal accident affecting the inhabitants' lives may be brought forth unless the garage door is immediatelly fully opened regardless of whatever condition of the garage door and is maintained in the full-open condition.

With a view to meet such a demand, it is a primary object of the present invention to provide a door operation control apparatus including additional commanding means and control means suitable for controlling the operation of a garage door in the event of such a specific situation so that the garage door can be driven according to a predetermined specific mode of door operation which is predominant over the normal mode of door operation.

The present invention attaining the above object is featured by the provision of a door operation control apparatus including door driving means for driving a garage door for opening and closing movement, main control means for controlling the door driving means, and main commanding means for generating a control signal applied to the main control means, wherein auxiliary control means for applying to the main control means a control signal for causing a predetermined specific mode of operation of the door is accurately controlled by specific-mode commanding means including an actuating switch or a fire sensor for applying an actuating signal to the auxiliary control means, and the specific-mode command signal from the specific-mode commanding means has priority over the control signal from the main commanding means commanding the normal mode of door operation.

The predetermined specific mode of door operation will be described more specifically. Since the object to be controlled is a garage door, any complex operation is not generally required, and the operation required is, for example, such that the garage door is fully opened from whatever condition. In the present invention, the apparatus has the function of continuously maintaining the garage door in the condition established at the time of completion of the specific mode of door operation so far as the actuating signal continues to appear from the specific-mode commanding means even after the end of the specific mode of door operation.

In accordance with one aspect of the present invention, there is provided a door operation control apparatus including door driving means for driving a garage door for opening and closing movement, main control means for controlling the door driving means, and main commanding means for generating a control signal applied to the main control means, the apparatus comprising auxiliary control means for applying to the main control means a control signal for moving the door to its full-open position, and specific-mode commanding means including actuating switch means for applying an actuating signal to the auxiliary control means, the auxiliary control means and the specific-mode commanding means being connected to the door operation control apparatus so that, when the actuating signal is applied from the specific-mode commanding means to the auxiliary control means, this actuating signal has priority over the command signal applied from the main commanding means, whereby the door is moved to its full-open position.

In accordance with another aspect of the present invention, there is provided a door operation control apparatus including door driving means for driving a garage door for opening and closing movement, and main commanding means for generating a control signal applied to the main control means, the apparatus comprising auxiliary control means for applying to the main control means a control signal for moving the door to its full-open position, and specific-mode commanding means including a fire sensor for applying an actuating signal to the auxiliary control means, the auxiliary control means and the specific-mode commanding means being connected to the door operation control apparatus so that, when the actuating signal is applied from the specific-mode commanding means to the auxiliary control means, this actuating signal has priority over the command signal applied from the main commanding means, whereby the door is moved to its full-open position.

The above and other objects, features and advantages of the present invention will become more apparent from the following detailed description of a preferred embodiment thereof taken in conjuction with the accompanying drawings, in which.

Figure 5:
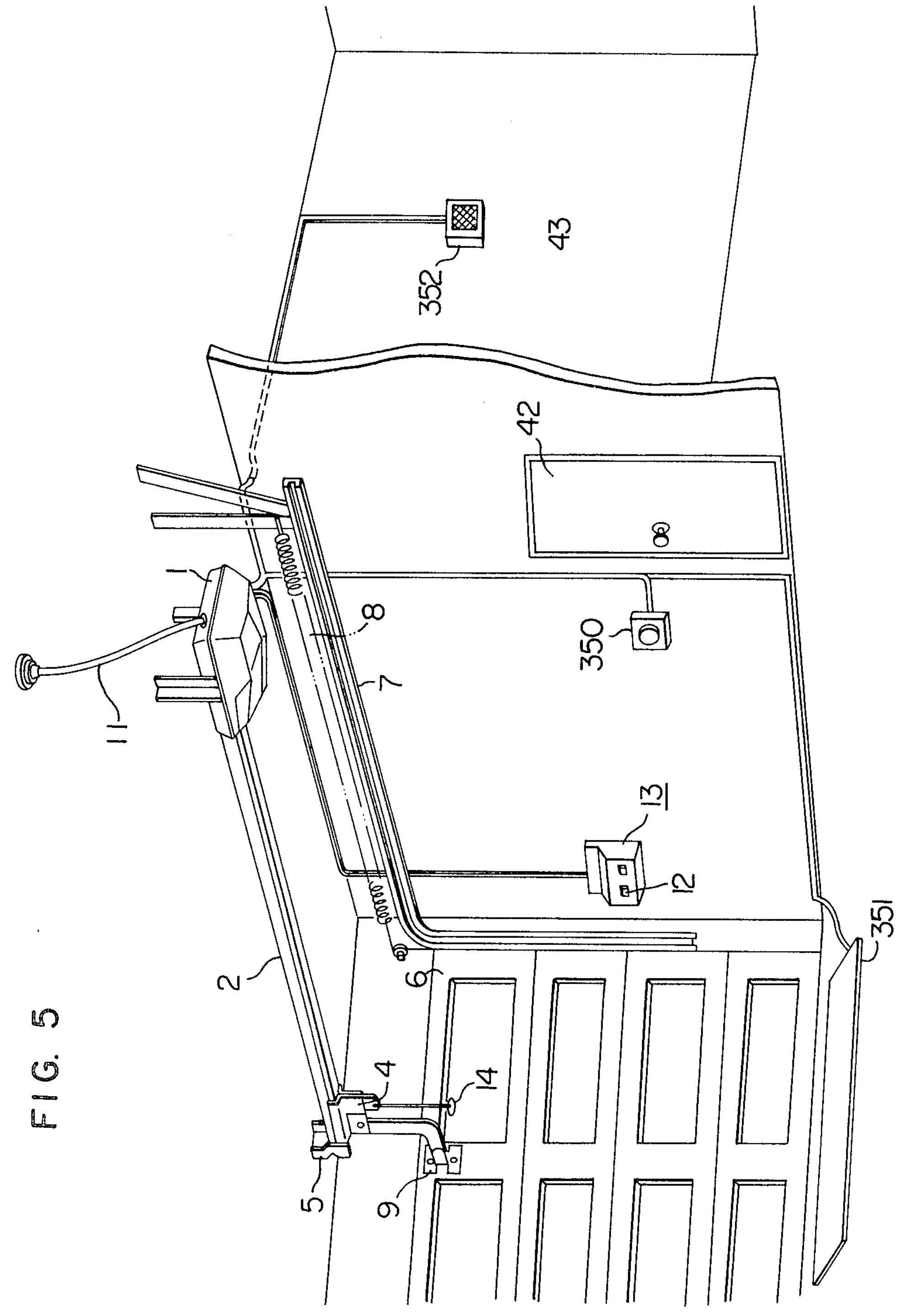
FIG. 5 is a perspective view showing the general arrangement of components of a garage door operating apparatus controlled by a preferred embodiment of the door operation control apparatus according to the present invention.
Figure 6:
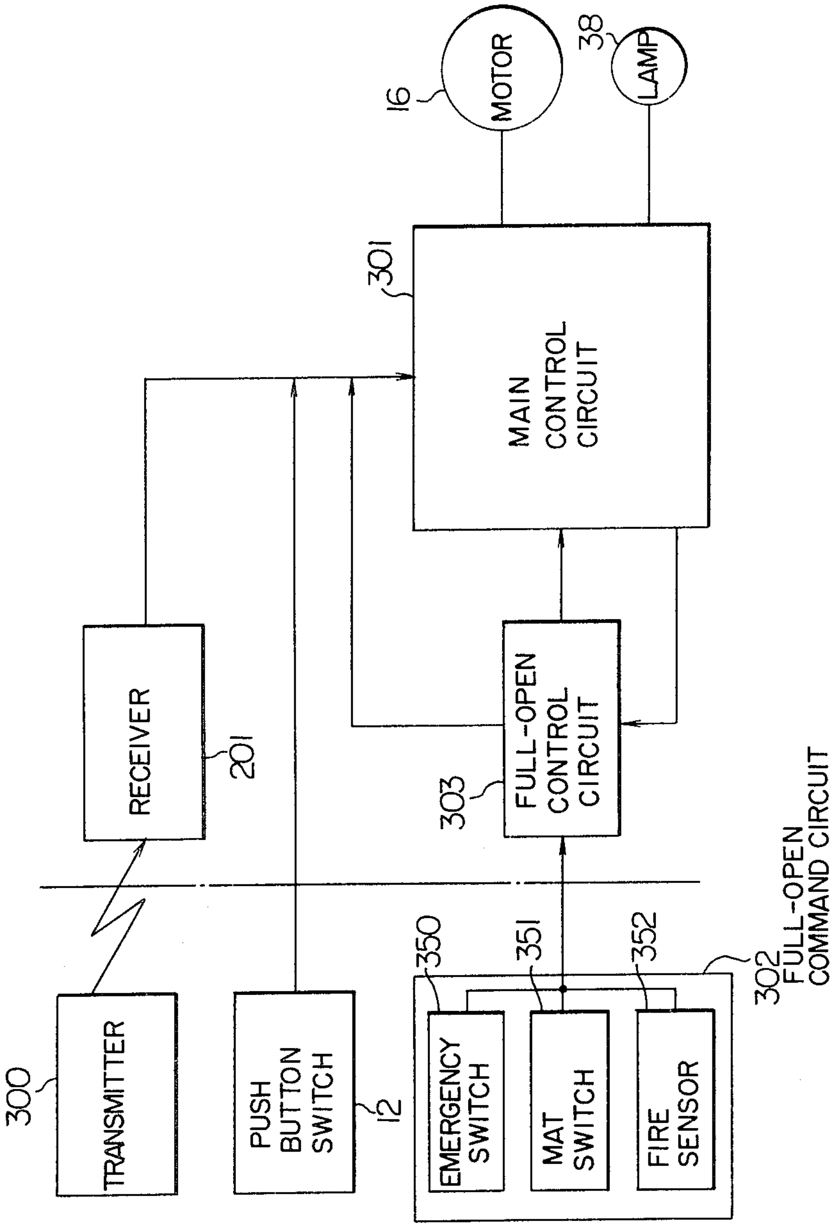
FIG. 6 is a basic block diagram of the door operation control apparatus embodying the present invention.
Figure 7:
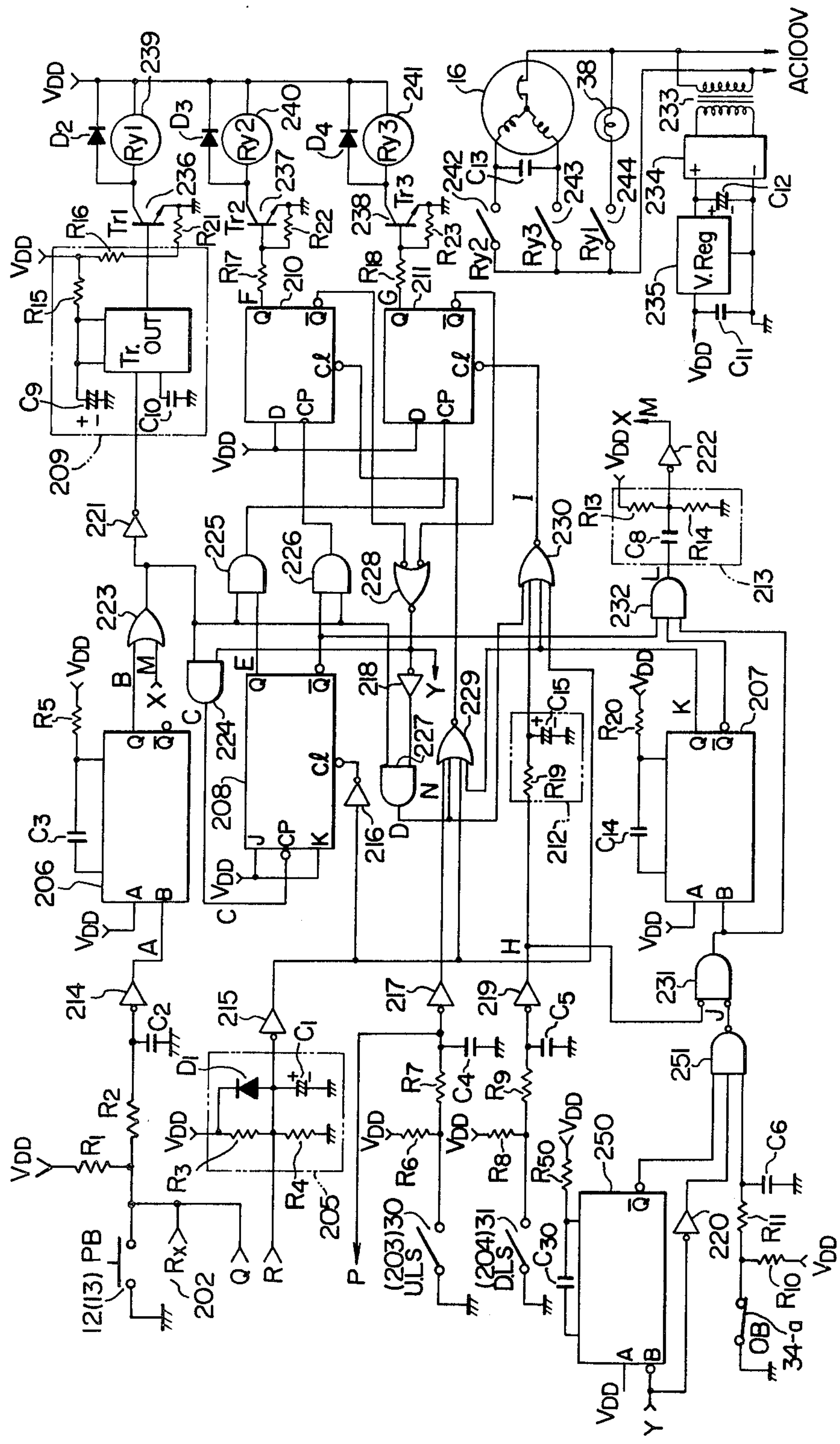
FIG. 7 is a circuit diagram of the main control circuit shown in FIG. 6.
Figure 8:
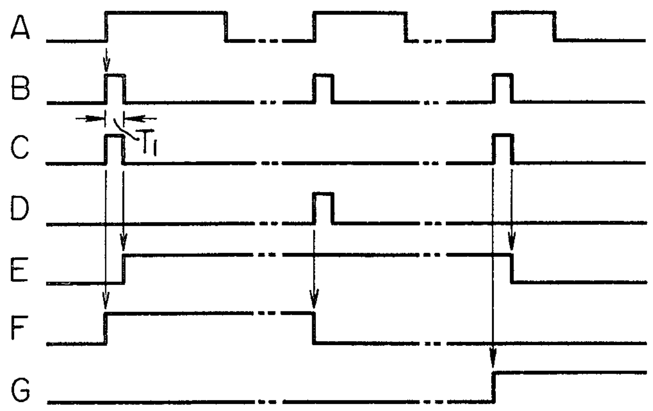
FIGS. 8 and 9 are timing charts illustrating the operation of the main control circuit shown in FIG. 7.
Figure 9:
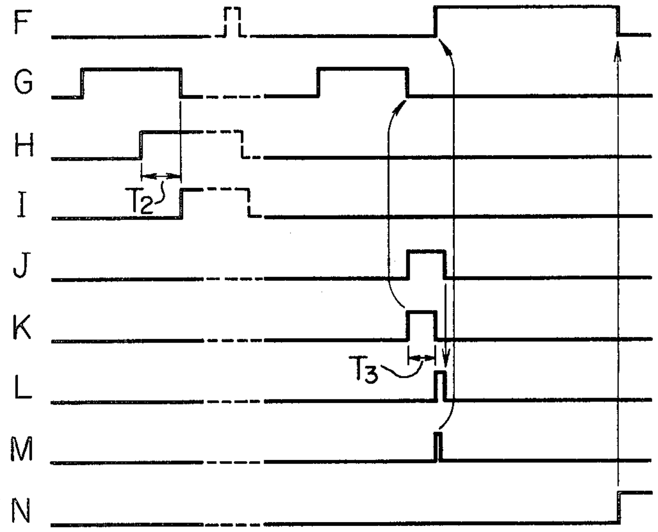
Figure 10:
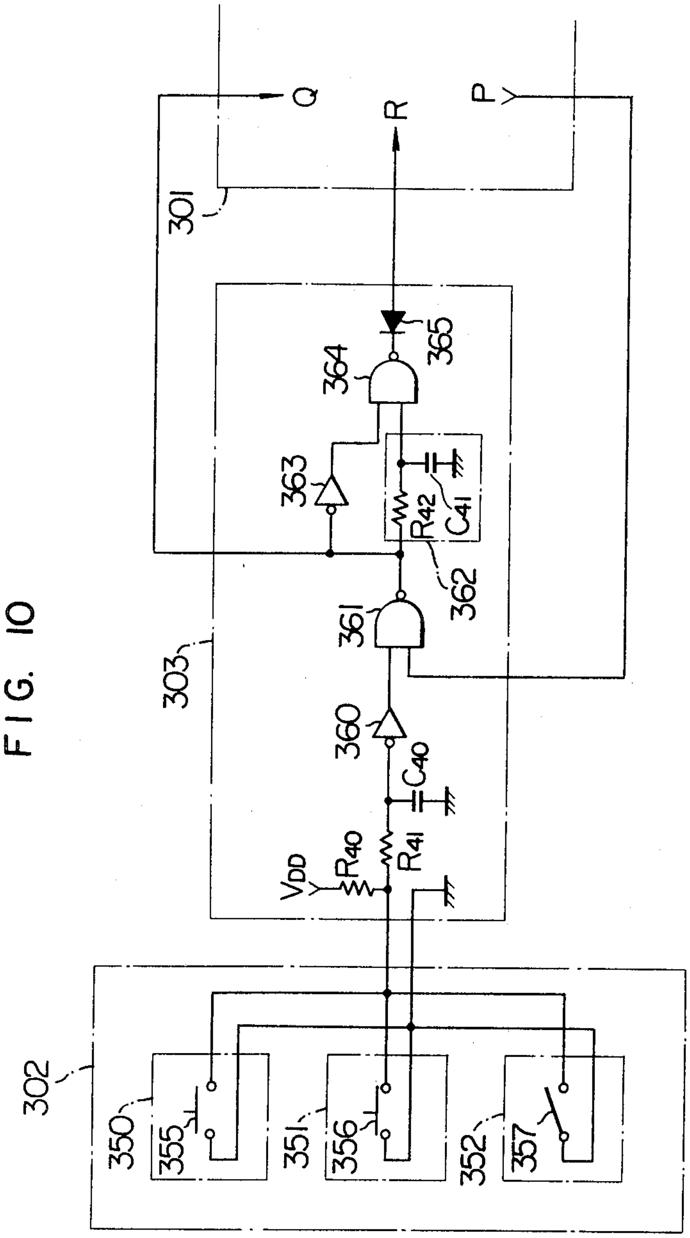
FIG. 10 is a circuit diagram of the full-open commanding circuit and full-open operation control circuit shown in FIG. 6.

A preferred embodiment of the door operation control apparatus according to the present invention will now be described in detail with reference to FIGS. 5 to 10, in which FIG. 5 is a perspective view showing the general arrangement of components of a garage door operating apparatus controlled by an embodiment of the door operation control apparatus according to the present invention, FIG. 6 is a basic block diagram of the door operation control apparatus embodying the present invention, FIG. 7 is a circuit diagram of the main control circuit shown in FIG. 6, FIGS. 8 and 9 are timing charts illustrating the operation of the main control circuit shown in FIG. 7, and FIG. 10 is a circuit diagram of the full-open commanding circuit and full-open operation control circuit shown in FIG. 6.

Figure 1:
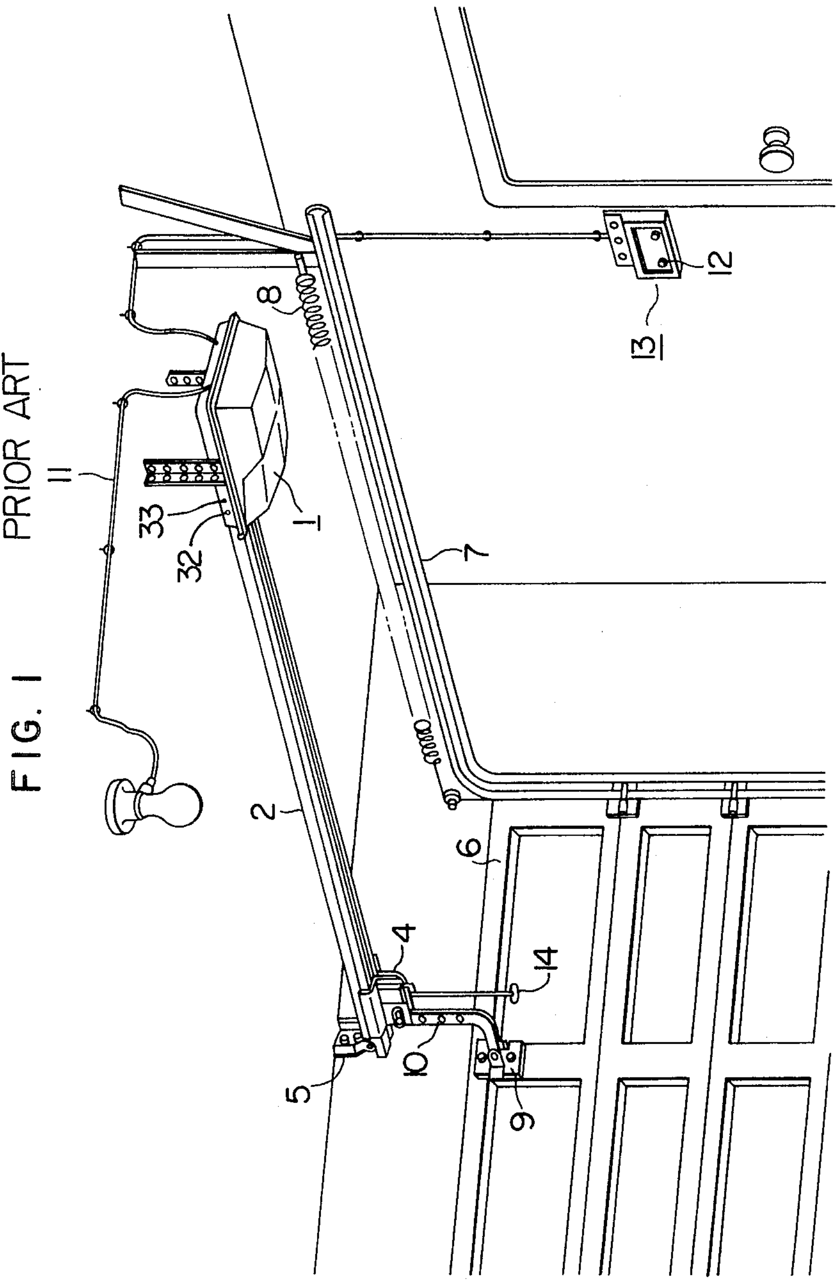
FIG. 1 PRIOR ART
FIG. 1 is a perspective view showing the general arrangement of components of a prior art garage door operating apparatus.
Figure 2:
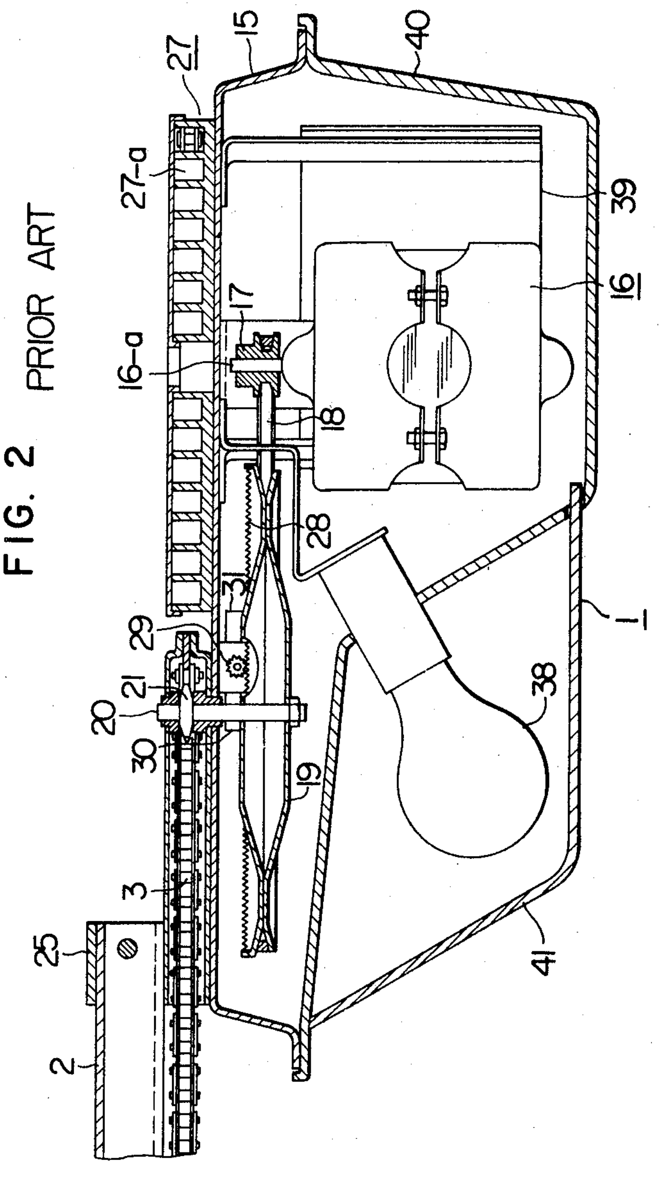
FIG. 2 PRIOR ART
FIG. 2 is an enlarged longitudinal sectional view of part of the prior art apparatus.
Figure 3:
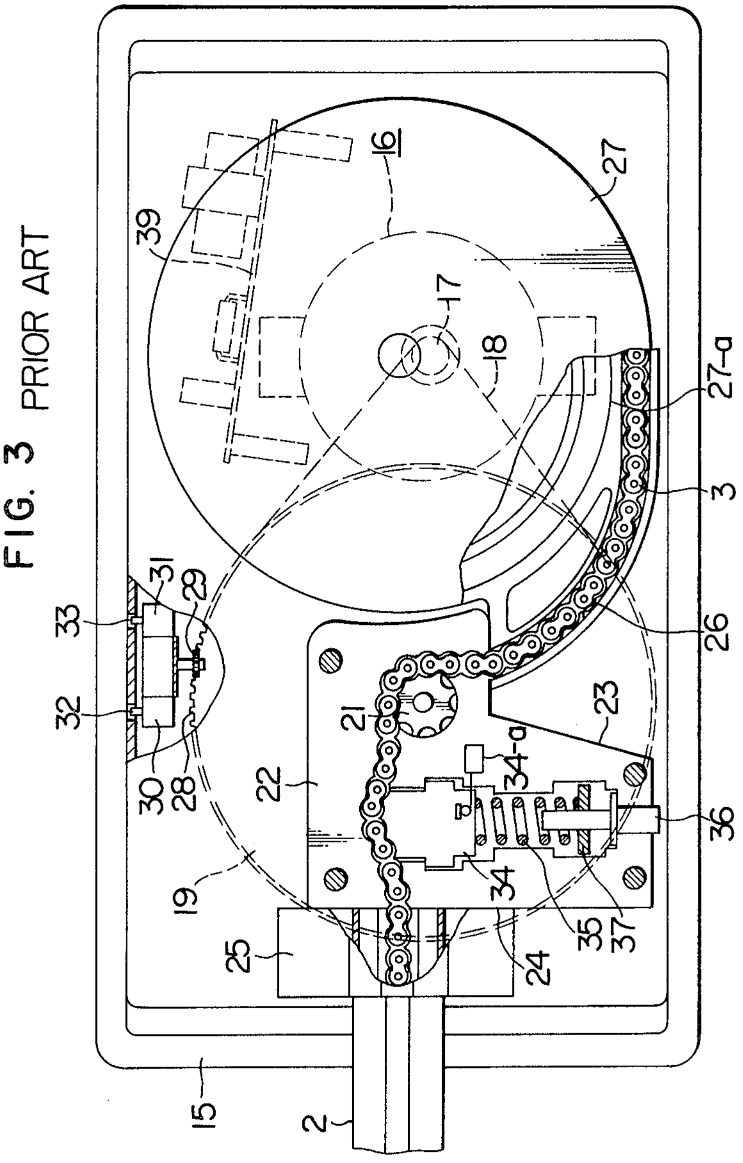
FIG. 3 PRIOR ART
FIG. 3 is a partly cut-away and partly sectional, top plan view of FIG. 2.
Figure 4:
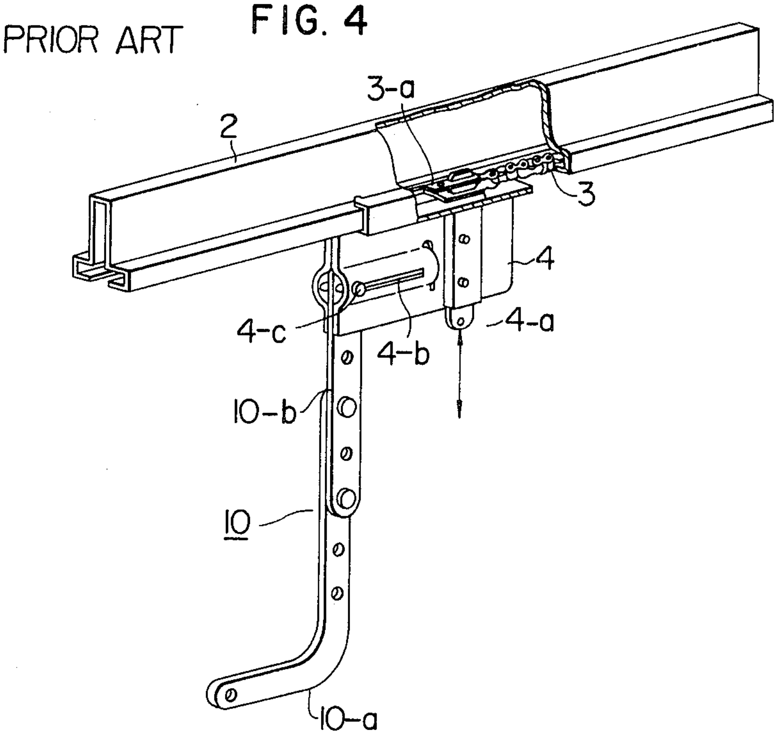
PRIOR ART FIG. 4
FIG. 4 is a partly cut-away perspective view of part of the prior art apparatus.

In FIG. 5, the same reference numerals are used to designate the same or equivalent parts appearing in FIG. 1, and reference numerals 42 and 43 designate a door and a room of a house respectively.

Referring to FIG. 5, additional switches such as an emergency push button switch 350 and a mat switch 351 are provided in the garage, and a fire sensor 352 is provided in the room 43 of the house. The switches 350, 351 and the fire sensor 352 belong to specific-mode commanding means. The emergency push button switch 350 and the switch 351 functioning as emergency operation commanding means are electrically connected in parallel with the fire sensor 352 disposed in the room 43 of the house partitioned from the garage by the door 42.

Referring to FIG. 6 which is a basic block diagram of the door operation control apparatus embodying the present invention, a transmitter 300 transmits a radio frequency signal, and a receiving and processing circuit 201 in the control unit 13 receives the radio frequency signal transmitted from the transmitter 300 and judges as to whether or not the received signal is actually the transmitter output signal. When the result of judgment proves that the received signal is the transmitter output signal, the circuit 201 generates an off-signal, while when the result of judgment proves that the received signal is not the transmitter output signal, the circuit 201 generates an on-signal. As described already, a push button switch 12 is mounted on the inner wall of the garage. The receiving and processing circuit 201 and the push button switch 12 belong to main commanding means.

The emergency push button switch 350, the mat switch 351 and the fire sensor 352 constitute a full-open commanding circuit 302. A full-open operation control circuit 303 belonging to or acting as auxilianry control means generates a full-open operation control signal under control of an actuation signal applied from the full-open commanding circuit 302 and a control signal applied from an upper limit switch 203 (described later) in a main control circuit 301 (described later) belonging to the main control means. The full-open operation control signal is applied from the full-open operation control circuit 303 to the main control circuit 301, and the motor 16 is energized for moving the garage door 6 to its full-open position. These control circuits are housed within, for example, the body 1.

Before describing the structure and operation of the circuits 302 and 303 exhibiting the above function, the structure and operation of the main control circuit 301 belonging to the main control means will be described with reference to FIGS. 7 to 9.

Referring first to FIG. 7, reference symbol Rx designates an output signal from a contact of a door operation commanding relay 202 energized in response to the depression of, for example, the push button switch 12 in the garage door operating apparatus. Reference numerals 203 (U.LS) and 204 (D.LS) designate an upper limit switch and a lower limit switch corresponding to the aforementioned upper and lower limit switches 30 and 31 respectively.

In FIG. 7, reference numeral 205 designates a power supply reset circuit for producing a reset signal at the rise of the power supply, numerals 206, 207 and 250 monostable multivibrators, numeral 208 a J-K master slave flip-flop, numeral 209 a timer circuit using for example, model NE555 (of Signetics Corporation), numerals 210 and 211 D-type flip-flops, numeral 212 an integrator circuit, numeral 213 a differentiator circuit, numerals 214 to 222 NOT elements, numeral 223 a 2-input OR element, numerals 224 to 228 2-input AND elements, numerals 229 and 230 4-input NOR elements, numeral 231 a 2-input NOR element, numeral 232 a 3-input AND element, numeral 251 a 3-input NAND element, numeral 233 a transformer providing a control power source, numeral 234 a diode stack, numeral 235 an IC regulator for the control power supply, numerals 236 to 238 relay-driving transistors (Tr1 to Tr3), for driving relays Ry1, Ry2 and Ry3 respectively, numerals 239 to 241 relay coils of the relays Ry1, Ry2 and Ry3 respectively, and numerals 242 to 244 relay contacts of the relays Ry1, Ry2 and Ry3 respectively. Reference symbol $V_{DD}$ designates a control power source voltage, symbols D1 to D4 diodes, symbols R1 to R11, R13 to R23 and R50 resistors, and symbols C1 to C6, C8 to C15 and C30 capacitors.

The operation of the main control circuit 301 will now be described with reference to FIG. 7 and also with reference to the timing charts shown in FIGS. 8 and 9.

When power is thrown in this circuit, the control source voltage $V_{DD}$ is supplied from the transformer 233 through the diode stack 234 and the IC regulator 235. The rise point of the voltage $V_{DD}$ is integrated by the power supply reset circuit 205 so that a reset pulse is produced through the NOT element 215. The reset pulse resets the J-K master slave flip-flop 208 through the NOT element 216, and further resets the D-type flip-flops 210 and 211 through the 4-input NOR elements 229 and 230 respectively.

Assuming that the NOT element 214 produces a signal A as shown in FIG. 8 in response to the turning-on of the push button switch 12 making up a door operation command or the turning-on of the relay contact 202 in the radio receiver in the control unit 13. Then, the monostable multivibrator 206 produces a signal B of pulse width T1 at the rise point of the signal A. This signal B is applied to the 2-input OR element 223, thence, to the 2-input AND element 224 which produces a signal C. The signal C is applied as a clock pulse signal to the J-K master slave flip-flop 208. During the high level state of the signal C before reversal of the output signal E of the flip-flop 208, the output of the 2-input AND element 226 is applied as a clock input signal to the flip-flop 210, so that the flip-flop 210 is set, thereby producing a signal F. With this signal F as a door up drive command, the transistor 237 excites the relay coil 240 for door upward movement. Thus, the relay contact 242 is turned on, thereby driving the motor 16 in the normal direction.

In this way, the motor 16 is started. At the same time, the signal B is applied as a trigger signal to the timer circuit 209 through the NOT element 221. This operation is intended to keep the lamp 38 ON for a predetermined length of time after the issue of the door operation command for illuminating the inside of the garage simultaneously with the start of the motor 16. For this purpose, the output of the timer circuit 209 excites the relay coil 239 through the transistor 236 to turn on the relay contact 244. As a result, the lamp 38 is lit for a predetermined length of time.

Next, if the upper limit switch 203 is turned on during the production of an up command output, the flip-flop 210 is reset through the NOT element 217 and the 4-input NOR element 229, so that the transistor 237 is turned off, the relay coil 240 is de-energized, the relay contact 242 is turned off, and the motor 16 stops. In the case where an operation command is issued again in response to the turning-on of the push button switch 12 or the relay contact 202 in the control unit 13, during the production of the up command, on the other hand, the pulse signal B is produced from the monostable multivibrator 206 as mentioned above, so that an output is produced from the 2-input OR element 223. In view of the fact that the D-type flip-flop 210 is set, however, the output of the 2-input AND element 228 is in its low level, thus prohibiting the output of the 2-input AND element 224. The output of the NOT element 218 is in its high level at this time, and therefore, the pulse signal B is produced in the form of a signal D from the 2-input AND element 227. This signal D is applied through the 4-input NOR element 229 to the D-type flip-flop 210 as a reset signal. In this way, the motor 16 is stopped in this case, too. Then, upon receipt of another operating command under this condition, the output of the 2-input, AND element 226 is prohibited in view of the fact that the J-K master slave flip-flop 208 is now set, so that the signal B is produced from the 2-input AND element 225 and the flip-flop 211 is set, thus producing the signal G. As a result, the transistor 238 is turned on, the door down drive relay coil 241 is excited, the relay contact 242 is turned on, the motor 16 is driven in the reverse direction, and thus the door is moved down.

If the lower limit switch 204 is turned on during the downward movement, a signal H is produced from the NOT element 219 and, after being delayed by time T2 at the integrator circuit 212, applied as a reset signal to the flip-flop 211 via the 4-input NOR element 230. In this way, the motor 16 is stopped as in the case of the upper limit switch 203 being turned on during upward movement.

Next, the operation of the circuit with the obstruction sensing switch 34-*a* turned on will be explained. Assume that the obstruction sensing switch 34-*a* is turned on when the door is moving up, i.e., when the J-K master slave flip-flop 208 is set, the D-type flip-flop 210 is set and the D-type flip-flop 211 is reset. In view of the fact that the obstruction sensing switch 34-*a* is closed at contact B, it is turned off. Thus, a high level signal J is applied from the 3-input NAND element 251 to the 2-input NOR element 231 to trigger the monostable multivibrator 207. The Q output pulse of the monostable multivibrator 207 resets the D-type flip-flop 210 through the 4-input NOR element 229. At this time, the J-K master slave flip-flop 208 is set, and, therefore, the output of the 4-input AND element 232 is prohibited.

Next, assume that the obstruction sensing switch 34-*a* is turned on during the downward movement, i.e., when the J-K master slave flip-flop 208 is reset, the D-type flip-flop 210 is reset and the D-type flip-flop 211 is set. As in the above case, the signal J is produced from the 3-input NAND element 251 to be applied via the 2-input NOR element 231 to the monostable multivibrator 207, and a signal K with pulse width T3 is produced from the monostable multivibrator 207. This signal K resets the D-type flip-flop 211 through the 4-input NOR element 230. As a result, the motor 16 is stopped and the door stops moving down. Further, at the fall point of the pulse signal K, the $\overline{Q}$ output of the monostable multivibrator 207 rises so that an input signal of high level is applied to the 3-input AND element 232 which produces a signal L. This signal L is converted into a signal M through the differentiator circuit 213 and the NOT element 222 and applied to the 2-input OR element 223. In this way, the signal F which is an up command is produced by the above-mentioned control process, with the result that the door moves up until the upper limit switch 203 is turned on and stops in response to an output signal N of the NOT element 217.

As will be seen from above, when the door senses an obstruction, the door is immediately stopped if moving up, and it is immediately stopped and begins to move up after the time period of T3 if moving down, thus securing the operating safety. In order to prevent the obstruction sensing means from being unduly actuated by a small obstacle such as a stone or a rod located near the door lower limit or the rise of the floor level due to snow in winter, the turning-on of the lower limit switch 204 causes the 2-input NOR element 231 to immediately prohibit the subsequent operation of obstruction detection, and the signal G making up a down command is reset by a signal I produced with time delay T2 from the integrator circuit 212. During the door stoppage, the input from the obstruction sensing switch 34-*a* is prohibited by the NOR element 231. Also in the case where the door stops with the obstruction sensing switch 34-*a* being actuated while the door is moving up, the switch 34-*a* is generally off. In order to assure smooth door starting, at the fall point of the output Y of the 2-input AND element 228, namely, in response to a door start signal, the monostable multivibrator 250 is triggered and the output thereof is applied as an input to the 3-input NAND element 251 thereby to ignore the obstruction sensing signal as long as the particular output is being produced. The negligence of the obstruction sensing signal during door stoppage is of course attained by applying the output Y of the 2-input AND element 228 to the 3-input NAND element similarly through the NOT element 220.

FIG. 10 shows the internal structure of the full-open commanding circuit 302 and full-open operation control circuit 303 described already with reference to FIG. 6 and shows also the connections between these circuits and the main control circuit 301.

The full-open commanding circuit 302 acting as the specific-mode commanding means is composed of the emergency push button switch 350, mat switch 351 and fire sensor 352 as described already and is electrically connected by two connection conductors to the full-open operation control circuit 303 to apply the actuating signal to the latter.

The emergency push button switch 350 is in the form of a self-holding type of push button switch 355 mounted on the inner wall of the garage.

The mat switch 351 includes an internal switch 356 disposed on the floor surface of the garage at a position adjacent to the garage door 6. When a pressure is imparted to the mat switch 351, the internal switch 356 is turned on as in the case of the switch 355 which is turned on in response to the depression.

The fire sensor 352 may be a conventional one and is such that a built-in fire sensing relay 357 is energized when a flame, a poisonous gas, smoke or the like is sensed. This fire sensor 352 is disposed in the room 43 of the house adjoining the garage.

The contacts of the specific-mode commanding elements 350, 351 and 352 are electrically connected in parallel with each other, so that the same actuation signal can always be applied to the full-open operation control circuit 303 when any one of the emergency push button switch 350, mat switch 351 and fire sensor 352 belonging to or acting as the specific-mode commanding means is turned on.

The full-open operation control circuit 303 belonging to or acting at the auxiliary control means includes resistors $R_{40}$, $R_{41}$, a capacitor $C_{40}$, NOT elements 360, 363, NAND elements 361, 364, an integration circuit 362 (having a time constant T4) and a reverse current blocking diode 365. The integration circuit 362 is composed of a resistor $R_{42}$ and a capacitor $C_{41}$. In response to the application of the actuating signal from the full-open commanding circuit 302 and the control signal from the main control circuit 301, the full-open operation control circuit 303 applies the full-open operation control signal to the main control circuit 301 as shown in FIG. 10.

The operation of the circuits 302 and 303 shown in FIG. 10 will now be described.

As described hereinbefore, the actuating signal applied from the full-open commanding circuit 302 to the full-open operation control circuit 303 is applied though the NOT element 360 to one of the input terminals of the 2-input NAND element 361. The signal P from the upper limit switch 203 in the main control circuit 301 is applied to the other input terminal of the 2-input NAND element 361.

Therefore, the 2-input NAND element 361 generates its output signal of low level only when the actuating signal applied from the full-open commanding circuit 302 is in its low level, and the signal P is in its high level which appears when the upper limit switch 203 is in its off position.

This output signal of low level from the 2-input NAND element 361 passes in parallel relation through the integration circuit 362 and NOT element 363 to be applied as two inputs to the 2-input NAND element 364, and the 2-input NAND element 364 generates a pulse output signal having a pulse width equal to the time constant T4 of the integration circuit 362. Thus, the output signal from the 2-input NAND element 364, which signal takes normally a high level, is turned into a low level during the period corresponding to the time constant T4.

The output signal from the 2-input NAND element 364 having the pulse width T4 is applied through the reverse current blocking diode 365 to the power supply reset circuit 205 described hereinbefore to establish the same condition as when the control source voltage $V_{DD}$ is supplied from the transformer 233. Consequently, the condition is the same as when the power supply is turned on, and, under this condition, the J-K master slave flip-flop 208 and the D-type flip-flops 210, 211 are reset.

In the meantime, the output signal of low level from the 2-input NAND element 361 is applied, as the door operating command, to the monostable multivibrator 206 through the NOT element 214 in the main control circuit 301 operating in response to the turning-on of the power supply. Consequently, the main control circuit 301 energizes the motor 16 so as to full open the garage door 6, and the opening movement of the garage door 6 is stopped at the position at which the upper limit switch 203 is turned on.

When, under such a condition of the garage door 6, the garage door 6 is accidentally moved in the closing direction by some means, the upper limit switch 203 is immediately turned off. At the same time, when at least one of the emergency push button switch 350, mat switch 351 and fire sensor 352 belonging or acting as to the specific-mode commanding means is maintained in its turned-on position, the full-open operation control circuit 303 applies the full-open operation control signal to the main control circuit 301 again so as to continue the control for maintaining the garage door 6 in the full-open position.

Only when all of the contacts of the emergency push button switch 350, mat switch 351 and fire sensor 352 belonging to or acting as the specific-mode commanding means are restored to their open position, no control signal appears now from the full-open commanding circuit 302 or the specific-mode commanding means which has priority over both of the signal receiving and processing circuit 201 and the push button switch 12 belonging to or acting as the main commanding means, and the garage door 6 is now controlled according to the normal mode of door operation control.

According to the aforementioned embodiment of the present invention, the garage door 6, which may be in the course of opening movement or closing movement or which may be stopped in an intermediate position, can be immediately moved to its full open position under control of the specific-mode commanding means having priority over the normal-mode commanding means, whenever at least one of such situations occurs as when an inhabitant having sensed a danger depresses the emergency push button switch 350 of self-holding type, when an inhabitant or a vehicle is present on the mat switch 351, or when the fire sensor 352 having sensed a flame, a poisonous gas or smoke generated due to a fire occurred in the house is energized. Therefore, the present invention can provide various advantages including improved safety ensuring necessary prevention of a disaster, while provided an improved handling capability.

Further, the present invention can prevent occurrence of an erroneous control operation thereby improving the reliability, due to the fact that the full-open commanding circuit 302 applies always the same control signal to the main control circuit 301 through the full-open operation control circuit 303, and its components are disposed independently of the main commanding means including the transmitter 300 and the normal-mode commanding push button switch 12.

Furthermore, the present invention improves also the safety from another aspect in that, when an inhabitant must go back and forth between the interior and the exterior of the house through the garage door 6 maintained full open or when he must work inevitably directly beneath the full-opened garage door 6, the garage door 6 continues to be maintained in the full-open position regardless of application of an input from the transmitter 300 or the push button switch 12 due to mishandling, unless the emergency push button switch 350 of self-holding type is depressed again after it has been depressed.

In addition to the above advantages, the inhabitants can flee to a place of safety through the door 42 and passage between the house and the garage in the event of an accident such as a fire, and, therefore, the possibility of a fatal injury to the fleeing inhabitants can be minimized, because the garage door 6 is fully opened as soon as the fire sensor 352 senses generation of a flame, a poisonous gas, smoke, etc. It is an additional advantage that the vehicle and articles in the garage can be smoothly carried to the exterior of the garage in such an event.

The reliability is further improved in that, so far as the fire sensor 352 is continuously operating, the garage door 6 is maintained in the full-open position in spite of application of an input from the main commanding means.

The number of the specific-mode commanding elements in the full-open commanding circuit 302 shown in FIG. 10 may be more than that illustrated, and such elements may be electrically connected in parallel with each other, provided that they are switches, relay contacts or switching circuits. Thus, various abnormal-condition sensors or emergeny push buttons may be provided in the number more than that illustrated, and such an arrangement finds various applications and adaptabilities, thereby providing a multifunctional door operation control apparatus operable with further improved safety and reliability.

It is apparent that various modifications may be made in which the emergency push button switch 350, the mat switch 351 or the fire sensor 352 may be singly provided or they may be provided in any desired combination.

It will be understood from the foregoing detailed description that the door operation control apparatus according to the present invention can operate with improved handling capability, safety and reliability, since the specific mode of garage door operation has priority over the normal mode of garage door operation. Further, by suitably selecting the commanding elements belonging to the specific-mode commanding means and combining them so as to be suitable for application to a given environment of a garage door, the safety and handling capability can be further improved.

What is claimed is:

1. A door operation control apparatus comprising door driving means for driving a garage door for opening and closing movement; main control means for controlling said door driving means including upper limit switch means for sensing when the door reaches an upper limit position and lower limit switch means for sensing that the door reaches a lower limit position; main commanding means for generating a control signal applied to said main control means to actuate said main control means; auxiliary control means for controlling said door driving means and specific-mode commanding means for actuating said auxiliary control means, said auxiliary control means and said specific-mode commanding means being independent of said main control means and said main commanding means; said specific mode commanding means including at least one actuating switch by which an actuating signal for actuating said auxiliary control means is produced, and said auxiliary control means including logic circuit means for logically processing said actuating signal from said specific-mode commanding means and an upper limit signal from said upper limit switch means to produce a first signal for forcedly setting said main control means to the opening movement state in priority over an applied control signal from said main commanding means and to produce a second signal for causing said door driving means to be controlled for the door to be driven for opening movement.

2. A door operation control apparatus as claimed in claim 1, wherein said actuating switch is at least one of an emergency push-button switch, a mat switch and a fire sensor.

3. A door operation control apparatus as claimed in claim 1, wherein said actuating switch is a push-button switch of the self-holding type.

4. A door operation control apparatus as claimed in claim 1, wherein said main control means includes bistable means responsive to the receipt of successive control signals from said main commanding means for alternately switching between first and second states where door opening and closing signals are generated, respectively, and applied in control of said door driving means, and wherein said logic circuit means includes means for applying said first signal to force said bistable means to remain in its first state regardless of the receipt of control signals form said main commanding means.

5. A door operation control apparatus as claimed in claim 4, wherein said specific-mode commanding means comprises a plurality of diverse switching devices connected in parallel to produce an actuating signal when any one of said switching devices is actuated.

6. A door operation control apparatus as claimed in claim 5, wherein one of said switching devices is a mat switch positioned adjacent said door.

7. A door operation control apparatus as claimed in claim 5, wherein one of said switching devices is part of a fire detector.

8. A door operation control apparatus as claimed in claim 4, further including means for selectively connecting a voltage supply to said main control means to enable operation thereof in response to the control signals from said main commanding means, said main control means including initialization means responsive to connection of said voltage supply to said main control means for setting said bistable means to its first state for door opening control, said logic circuit means being connected to apply said first signal to said initialization means to cause said bistable means to be set to said first state for the duration of said first signal.

* * * * *